H. W. A. FUHRMANN.
VARIABLE AUTOMATIC CUT-OFF.
APPLICATION FILED JULY 25, 1914.

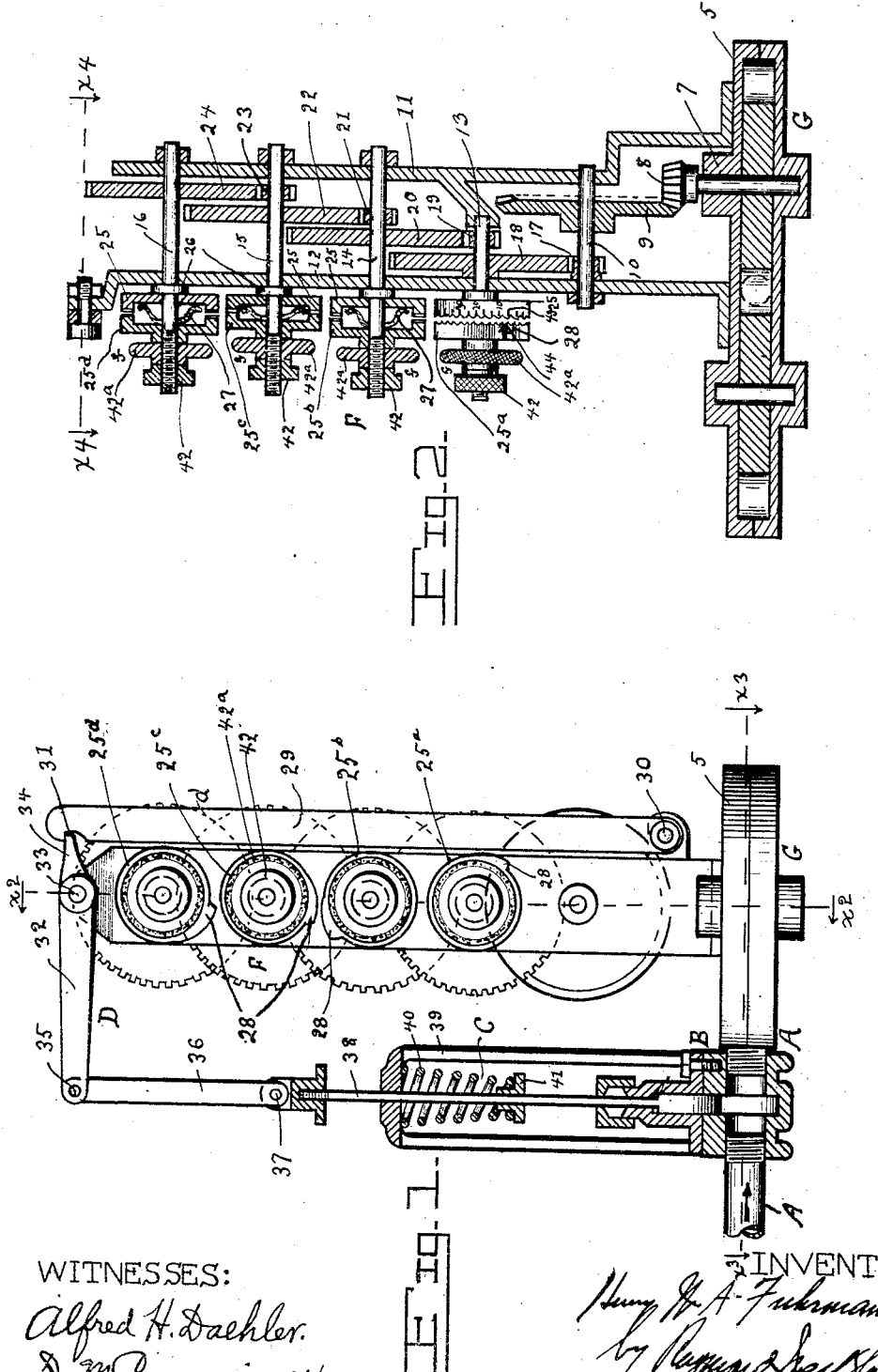
H. W. A. FUHRMANN.
VARIABLE AUTOMATIC CUT-OFF.
APPLICATION FILED JULY 25, 1914.
1,246,412.
Patented Nov. 13, 1917.
2 SHEETS—SHEET 1.

1,246,412.

Patented Nov. 13, 1917.
2 SHEETS—SHEET 2.

WITNESSES:
Alfred H. Daehler.
D. M. Cummings

INVENTOR,
Henry W. A. Fuhrmann,
by Raymond [?]
HIS ATTORNEY.

UNITED STATES PATENT OFFICE.

HENRY W. A. FUHRMANN, OF ALHAMBRA, CALIFORNIA.

VARIABLE AUTOMATIC CUT-OFF.

1,246,412.  Specification of Letters Patent.  Patented Nov. 13, 1917.

Application filed July 25, 1914. Serial No. 853,021.

*To all whom it may concern:*

Be it known that I, HENRY W. A. FUHRMANN, a citizen of the United States, residing at Alhambra, in the county of Los Angeles and State of California, have invented new and useful Improvements in Variable Automatic Cut-Offs, of which the following is a specification.

This invention relates to variable automatic cut-offs, whereby the flow of a fluid or other material may be terminated or reduced when a pre-determined period of such flow has occurred. More particularly, the invention relates to variable automatic cut-offs for water and like fluids, whereby the supply or flow of such fluids may be terminated after a certain amount of the same has been discharged. Such apparatus is of particular advantage and service in regulating the supply of water for purposes of irrigation, or in filling tanks, boilers, barrels, or other receptacles or containers. In accordance with the present invention, the operation of the cut-off may be so regulated that a pre-determined number of feet, gallons, or like quantity of fluid may be supplied or discharged, subsequent to or upon which discharge termination of such discharge will occur automatically, such automatic action being produced under control of the moving fluid itself. Thus, the operator or person in control of the apparatus may set or adjust the same to discharge the certain desired quantity of fluid, and may leave to the automatic action of the apparatus the discharge of such certain amount of fluid, without further attention to that end being required. As soon as the proper discharge has taken place, no further fluid movement will be permitted until the apparatus has been re-set so as to permit a succeeding action by it in regulation of further liquid movement.

The invention has for its object to provide improved apparatus of the general character stated which will be superior in point of relative simplicity and inexpensiveness of construction and organization, reliability and accuracy in operation, facility in use and control and adjustment and durability, which will not be liable to get out of order or adjustment, and which will be generally superior in efficiency and serviceability.

With the above and other objects in view, the invention consists in the novel and useful provision, formation, construction, combination, association and relative arrangement of parts, members and features, all as hereinafter described, shown in the drawings, and finally pointed out in claims.

In the drawings:

Figure 1 is a front elevation of a variable automatic cut-off mechanism or apparatus organized in accordance with the invention;

Fig. 2 is a vertical transverse sectional view of the same, taken upon the line $x$—$x^2$, Fig. 1, and looking in the direction of the appended arrows;

Corresponding parts in all the figures are designated by the same reference characters.

Figure 3:
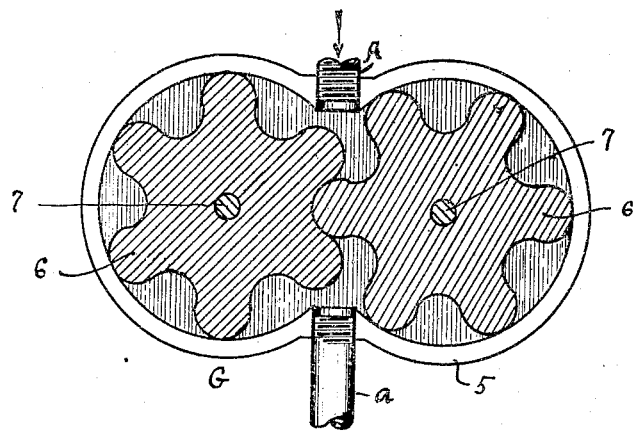
Fig. 3 is a detail horizontal sectional view of the same, taken upon the line $x^3$—$x^3$, Fig. 1, and looking in the direction of the appended arrows; and, Fig. 4 is a detail transverse sectional view, taken on the line $x^4$—$x^4$, Fig. 2, and looking in the direction of the appended arrows.
Figure 4:
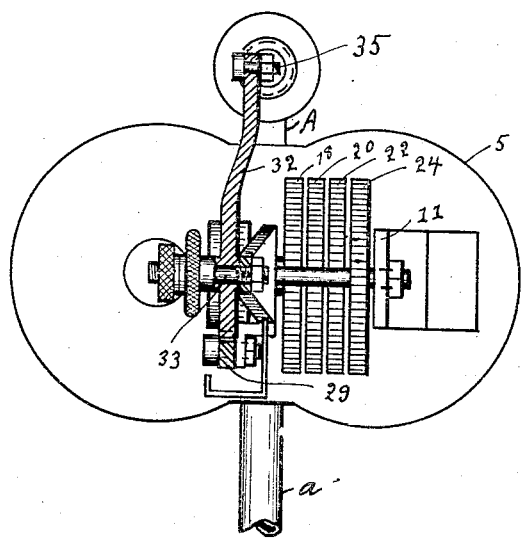

Referring with particularity to the drawings, A designates therein a supply pipe for water or other liquid through which such liquid is passed in the direction denoted by the arrows in Figs. 1 and 3, to an outlet or discharge nozzle $a$. B designates a cut-off valve or gate-valve, of conventional or any preferred form, whereby the flow of liquid through the supply pipe A may be terminated. C designates means acting normally to operate the valve B to so cut off the flow of liquid through the pipe A. D designates means opposing the action of the means C, and acting to hold the valve B in open position, such means D including a trip member $d$. F designates operating means for the trip member $d$, and including a plurality of separate adjustable members $f$; and G designates an actuator for the operating means F, such actuator being impelled by fluid passing through the supply pipe A.

In the particular and specific form of construction and combination of parts, members and features disclosed in the drawing, which is merely one embodiment or one specific form of the invention, the actuator is shown as comprising a casing 5 which the supply pipe A is interrupted to receive, and two meshed rotors 6 journaled within the casing 5 to be jointly and oppositely rotated by the flow of liquid through such casing and through the supply pipe a, beyond the gate valve B, said rotors are mounted upon independent shafts 7, one of which is provided with a bevel pinion 8 meshing with a bevel gear 9, upon a shaft 10, such parts 8, 9, and 10 being included within the operating means F for the trip member d of the means D. Such means F further include spaced standards or uprights 11 and 12 between which the shaft 10 is journaled, as are other shafts 13, 14, 15 and 16, which are arranged, spaced apart, in a vertical series. The shaft 10 carries a pinion 17 meshing with a gear 18 upon the shaft 13; the shaft 13 also carries a pinion 19 meshing with a gear 20 upon the shaft 14. The shaft 14 also carries a pinion 21 meshing with a gear 22 upon the shaft 15. The shaft 15 also carries a pinion 23 meshing with a gear 24 upon the shaft 16. Thus, all the shafts 10, 13, 14, 15 and 16 are jointly rotated by and upon rotation of the shaft 7 of one of the rotors 6 which is operated by the flow of liquid through the supply pipe A. Each of the shafts 13, 14, 15 and 16, outside of the standards 11 and 12, carries a fixed clutch member 25, and a loose clutch member $25^a$, $25^b$, $25^c$ and $25^d$, respectively. Heads 26 are formed upon said shafts between the adjacent standard 12, and the respective fast clutch members 25; and bowed leaf springs 27 are provided between the clutch member 25 and its companion loose clutch member, in each such pair of fast and loose clutch members. Each of the loose clutch members is a cam in formation, having a nose 28 adapted to coöperate with the trip member d which comprises an arm 29 pivotally supported at its lower end as at 30, and ranging substantially vertically, and adapted to be so positioned as to be engaged by the nose 28. At its upper end the arm 29 is formed into a hook or catch 31. The remaining portion of the means D, for opposing the action of the means C, comprises a lever arm 32 pivotally supported as at 33, between its ends, upon the standard 12, and being provided at one end with a finger 34 adapted to be engaged with the catch 31. At its other end the lever arm 32 carries pivotally as at 35, a depending link 36 pivotally connected at its lower end, as at 37, with the stem 38 of the gate valve B, which stem is guided in a suitable frame 39 by which the upper end of a coil compression spring 40, constituting the means C, is confined. The lower end of such spring 40 is confined by a stop 41 upon the valve stem 38. The other features of the gate valve are of conventional design, or constructed as may be desired for any particular service.

Lock nuts 42 are preferably applied to the several shafts 13, 14, 15 and 16, to hold the adjustable clutch members on such shafts against dis-connection, when such members are out of contact with the fixed clutch members 25; said adjustable clutch members having thumb nuts $42^a$ adapted to fasten the same, and threaded upon the outer ends of said shafts, upon which the lock nuts 42 are likewise threaded.

Suitable calibrations are formed on each of the fixed clutch members 25, as at 43, and an indicating mark 44 is provided on the nose 28 of each of the adjustable clutch members. By bringing the mark 44 into registration with certain of the calibrations 43 any desired adjustment within the range of the apparatus may be made.

The operation, method of use and advantages of the improvements in variable automatic cut-offs constituting the invention will be readily understood from the foregoing description, taken in connection with the accompanying drawing and following statement:

The passage of fluid through the supply pipe A is permitted when the stem 38 of the gate valve B is raised against the spring 40, and the finger 34 upon the lever arm 32 is engaged with the catch 31 upon the trip member d. The means F for operating the trip member are then set so that the trip member will be operated when a pre-determined amount of fluid has passed through the supply pipe A. This is accomplished by engaging the proper loose clutch member $25^a$ to $25^d$ with its companion fast clutch member 25, upon the proper shaft 13, 14, 15 or 16, no such pair of clutch members, or member f of the means F, being shown as applied to the shaft 10. Because of the gearing together of the several shafts, as described and shown in the drawing, it will require progressively a greater number of rotations of the shaft 7 of the actuator G to rotate the shaft 16 once than it will to rotate the shaft 15 once; and the same is true with respect to the shaft 15 as compared with the shaft 14, and with the shaft 14 as compared with the shaft 13. Thus, a greater amount of fluid will have to pass through the pipe A to rotate the shaft 16 once than to rotate the shaft 15 once, and so on with respect to the shaft 15 in comparison with the shaft 14, and with respect to the shaft 14 in comparison with the shaft 13. Let it be assumed that a thousand feet of fluid flow through the casing 5 will be required to rotate the shaft 13 once, ten thousand feet of flow to rotate the shaft 14 once, one hundred thousand feet of flow to rotate the shaft 15 once, and a million feet of flow to rotate the shaft 16 once. If now, with the parts in the position shown in the drawing, it is desired to cut off the flow of fluid through the pipe A, when the amount of flow has totaled that related, as stated, to a single rotation of each of the shafts mentioned, all that is necessary is to allow the clutch members of other shafts to remain dis-engaged each with respect to the other, and to engage the clutch members of the particular shaft related to the flow which it is desired to have completed prior to cutting off further flow. Such engagement of clutch members is produced by manipulating the respective thumb nut 42ª against the resistance of the spring 27. Thereupon, when the related amount of liquid flow has taken place through the casing 5, the rotors therein will, through the train of shafts, pinions and gears between the standards 11 and 12, cause the proper nose 28 to be brought into engagement with the trip member $d$, freeing the nose 34 from the catch 31, permitting the valve stem 38 to fall, and permitting the spring 40 to close the gate valve and shut off further flow of the liquid. When the valve 38 is raised, the catch 31 is brought again over the finger 34, and the flow of liquid may again be cut off when a pre-determined amount has passed through the casing 5 to the discharge nozzle or orifice $a$, by properly setting the proper clutch members of the proper member $f$ of the means F, whereupon the operation above set forth will ensue.

It is manifest that many variations may be made with respect to the provision, formation, combination, association and relative arrangement of parts, members and features, in adapting the invention to varying conditions of use and service, all without departing from the spirit of the invention and a fair interpretation thereof.

Having thus disclosed my invention, I claim and desire to secure by Letters Patent:

1. Apparatus of the character disclosed, comprising, in combination with fluid supply means; means acting to interrupt such fluid supply, means opposing the action of said interrupting means to normally render said interrupting means inoperative, means operating to free said interrupting means from said opposing means, and an actuator for said operating means operated by the flow of fluid; said opposing means comprising two members adapted to be detachably co-engaged; and said operating means comprising a plurality of members differentially moved by said actuator and each of which is adapted to be engaged with one of said members of said opposing means to disconnect said members thereof.

2. Apparatus of the character disclosed, comprising, in combination with fluid supply means; means acting to interrupt such fluid supply, means opposing the action of such interrupting means to normally render said interrupting means inoperative, means operating to free said interrupting means from said opposing means, and an actuator for said operating means operated by the fluid flow; said opposing means comprising two members adapted to be detachably co-engaged; and said operating means comprising a plurality of members differentially related to said actuator and each of which is adapted to be engaged with one of said members of said opposing means to disconnect said members thereof; and means whereby each of said members of said operating means may be selectively operated.

3. Apparatus of the character disclosed, comprising, in combination with fluid supply means; means acting to interrupt such fluid supply, means opposing the action of said interrupting means to normally render said interrupting means inoperative, means operating to free said interrupting means from said opposing means, and an actuator for said operating means operated by the fluid flow; said opposing means comprising two members adapted to be detachably co-engaged; and said operating means comprising a plurality of differentially driven members each of which is adapted to be engaged with one of said members of said opposing means to disconnect said members thereof; and means for selectively operating said members of said operating means; each of said members of said operating means comprising separate clutch members, and means normally holding said clutch members apart.

4. Apparatus of the character disclosed, comprising, in combination with a fluid conduit; a valve controlling the flow of fluid through said conduit, means acting normally to close the valve, means opposing said closing means, operating means whereby said opposing means are operated to free said valve therefrom, and an actuator for said operating means operated by the flow of fluid through said conduit; said opposing means comprising two co-engaged means, and said operating means comprising a plurality of separate differentially driven members, and means for selectively operating the same responsive to varying flow of fluid through said conduit.

5. Apparatus of the character disclosed, comprising, in combination with a fluid conduit; a valve controlling the flow of fluid through said conduit, means acting normally to close the valve, means opposing said closing means, operating means whereby said opposing means are operated to free said valve therefrom, and an actuator for said operating means operated by the flow of fluid through said conduit; said opposing means comprising two co-engaged members, and said operating means comprising a plurality of separate members each having a different ratio with respect to said actuator, and means for selectively operating the same responsive to varying flow of fluid through said conduit; each of said separate members of said operating means comprising separate clutch parts, one of which is provided with a working part which coöperates with one member of said opposing means; said sets of clutch parts being mounted upon separate shafts all of which such shafts are coengaged for joint rotation at varying speeds.

In testimony whereof, I have signed my name to this specification in the presence of two subscribing witnesses.

HENRY W. A. FUHRMANN.

Witnesses:
G. ROY PENDELL,
ALFRED H. DAEHLER.